USO05264010A

United States Patent [19]

Brancaleoni et al.

[11] Patent Number: 5,264,010
[45] Date of Patent: Nov. 23, 1993

[54] COMPOSITIONS AND METHODS FOR POLISHING AND PLANARIZING SURFACES

[75] Inventors: Gregory Brancaleoni, Newark; Elmer W. Jensen, New Castle; John V. H. Roberts, Newark, all of Del.

[73] Assignee: Rodel, Inc., Newark, Del.

[21] Appl. No.: 874,654

[22] Filed: Apr. 27, 1992

[51] Int. Cl.$^5$ ............................................. C09C 1/68
[52] U.S. Cl. ...................................... 51/308; 51/293; 51/309; 106/3; 106/6
[58] Field of Search ........................ 51/293, 308, 309; 106/3, 6

[56] References Cited

U.S. PATENT DOCUMENTS

| | | | |
|---|---|---|---|
| 3,863,395 | 2/1975 | Brown | 51/121 |
| 4,057,939 | 11/1977 | Basi | 106/3 |
| 4,169,337 | 10/1979 | Payne | 51/283 R |
| 4,226,623 | 10/1980 | Koshiyama et al. | 106/3 |
| 4,462,188 | 7/1984 | Payne | 51/283 R |
| 4,588,421 | 5/1986 | Payne | 51/308 |
| 4,601,755 | 7/1986 | Me'lard et al. | 106/3 |
| 4,769,073 | 9/1988 | Tastu et al. | 106/3 |
| 4,786,325 | 11/1988 | Melard et al. | 106/3 |
| 4,954,142 | 9/1990 | Carr et al. | 51/309 |
| 4,959,113 | 9/1990 | Roberts | 156/636 |
| 5,026,421 | 6/1991 | LeLoarer et al. | 106/3 |

OTHER PUBLICATIONS

Peter A. Burke, "Semi-Empirical Modelling of SiO$_2$ Chemical-Mechanical Polishing Planarization", Jun. 11–12, 1991, VMIC Conference, pp. 379–384.
Ronald R. Uttecht and Robert M. Geffken, "A Four-Level-Metal Fully Planarized Interconnect Technology For Dense High Performance Logic and SRAM Applications", Jun. 11–12, 1991, VMIC Conference, pp. 20–26.

*Primary Examiner*—Mark L. Bell
*Assistant Examiner*—Willie J. Thompson
*Attorney, Agent, or Firm*—Panitch, Schwarze, Jacobs & Nadel

[57] ABSTRACT

An abrasive composition for use in polishing or planarizing the surface of a work piece is provided comprising about 30 to 50 percent of cerium oxide; about 8 to about 20 percent of fumed silica and about 15 to about 45 percent of precipitated silica. Methods using the composition to polish or planarize the surfaces of work pieces, as well as products produced by such methods, are also provided.

24 Claims, No Drawings

COMPOSITIONS AND METHODS FOR POLISHING AND PLANARIZING SURFACES

FIELD OF THE INVENTION

The present invention is directed to compositions useful for polishing and planarizing the surfaces of various work pieces, such as the surfaces of semiconductors, as well as methods for their use and products produced thereby.

BACKGROUND OF THE INVENTION

Compositions useful for polishing the surfaces of various work pieces are well known in the art. Conventional polishing compositions, which are used for polishing the surfaces of semiconductors, glass, crystal, metal and ceramic work pieces, generally comprise aqueous slurries of an appropriate abrasive agent or mixtures of such agents. Known abrasive agents include cerium oxide, aluminum oxide, zirconium oxide, tin oxide, silicon dioxide, titanium oxide, etc. Composition comprising such agents are generally used by first applying the composition to a polishing pad or to the surface to be polished. The polishing pad is then applied to the surface, which causes the abrasive particles contained within the composition to mechanically abrade the surface, thus effecting the polishing action. However, such conventional polishing compositions cannot produce the highly specular and planar surfaces required in semiconductor and microelectronic component technology. Moreover, conventional polishing compositions have demonstrated disadvantages, such as poor polishing rates and poor surface quality, in polishing other work pieces. For example, the surfaces of glass, metals, semiconductors, etc., polished with such compositions demonstrate various defects such as haze, stains, scratches, "orange peel", undulations, undercuts, mesas, etc.

Thus, attempts have been made to improve the efficiency and quality of polishing compositions. Two methods of attaining improvement in these areas have been directed to combining various abrasives and/or adding various adjuvants to the compositions.

Polishing compositions comprising specific combinations of abrasive particles are disclosed, e.g., in U.S. Pat. No. 4,601,755 which discloses polishing compositions comprising at least one crystalline phase of cerium oxide and a rare earth pyrosilicate. U.S. Pat. No. 4,786,325 discloses a glass polishing composition comprising ceric oxide and at least one oxide of a lanthanide or yttrium rare earth. Likewise, U.S. Pat. No. 4,769,073 discloses cerium-based polishing compositions for polishing organic glass surfaces which comprise ceric oxide, a cerous salt and optionally, pyrosilicates or silica.

Examples of the use of adjuvants in polishing compositions are disclosed, e.g., in U.S. Pat. No. 4,959,113 which discloses compositions useful for polishing metal surfaces which comprise water, an abrasive agent and a salt or a combination of salts to promote the polishing effectiveness of the metal surface by the abrasive agent. Similarly, U.S. Pat. No. 4,462,188 is directed to semiconductor polishing compositions which comprise a colloidal silica sol or gel, a water soluble amine and a water soluble quaternary ammonium salt or base. U.S. Pat. No. 4,588,421 discloses compositions useful for polishing silicon wafers comprising an aqueous colloidal silica solution gel and piperizine. It is disclosed that the addition of piperizine provides increased polishing efficiency among other benefits. U.S. Pat. No. 4,954,142 discloses methods for polishing electronic components comprising contacting the surface of the component with a slurry comprising abrasive particles, a transition metal chelated salt and a solvent. This patent further discloses that the abrasive particles may be any of those commonly used such as silica, ceria, alumina, silicon carbide, silicon nitride, ferric oxide, etc.

However, even with such combinations of abrasive agents and the addition of adjuvant materials, conventional polishing compositions cannot produce the planarized surfaces needed in modern semiconductor and microelectronics technology.

Preparation of semiconductors and other microelectronic components generally involves building many interconnected layers of components, which may include products like very large scale integrated circuits (VLSIC) and ultra large scale integrated circuits (ULSIC). Thus, compositions useful for polishing or planarizing semiconductors must be able to polish complex, anisotropic, composite surfaces which are comprised of multiple layers of interconnected high density integrated circuits both at and below the surface. In preparing semiconductors, the structure resulting from the interconnected layers of integrated circuitry is polished down to a predetermined planar level which may comprise components of varying size, shape and hardness, as well as trenches, holes and valleys of various depths and shapes. After such polishing, semiconductor preparation may continue by various other procedures, such as chemical vapor deposition, metalization via vapor deposition, photolithographic patterning, diffusion, etching, etc., as will be recognized by one skilled in the art.

To provide superior results, the composition used to polish or planarize the surface of the prepared semiconductor work piece must produce an extremely flat and level surface with a high quality polish, i.e., a planar surface. However, unlike conventional polishing, to provide a planar surface, the polishing action must be restricted to the level surface of the work piece and must not affect the topography, morphology and/or structures below that surface. Only such selective polishing action will produce the desired planar surface. Conventional polishing compositions are not suited for such procedures as they merely produce uneven, undulating surfaces by abrading certain regions on, below and within the surface of the work piece. It has proven difficult, if not impossible, to use conventional polishing products to obtain smooth defect-free surfaces wherein the polishing composition does not adversely effect the underlying structure of the work piece.

In these specialized fields of semiconductor and microelectronic component preparation, where layers of components are interconnected within tiny chips of silicon, ceramic or other insulator work pieces, extraordinarily planar surfaces are required at many levels. Otherwise, the function of the semiconductor or other device may be adversely affected to the point where it is worthless. Thus, the many microprocessing steps used to make such a device and the associated labor and equipment may be wasted by only one surface which may be defective because planarization techniques did not produce sufficiently planar surfaces.

Accordingly, it can be seen that there has been a long-felt need for compositions which provide improved polishing activity at improved rates, which will produce planar and defect-free surfaces, as well as methods for the use of such compositions. The present invention satisfies such long-felt need.

SUMMARY OF THE INVENTION

One aspect of the present invention is an abrasive composition for use in polishing or planarizing the surface of a work piece comprising about 30 to about 50 percent of cerium oxide; about 8 to about 20 percent of fumed silica and about 15 to about 45 percent of precipitated silica.

Another aspect of the present invention is an aqueous slurry for polishing or planarizing a work piece. The present aqueous slurry is comprised of water and about 5 to about 20 percent by weight of the present abrasive composition.

Still another aspect of the present invention is a method of polishing or planarizing the surface of a work piece comprising (a) applying an aqueous slurry of the present abrasive compositions to the surface of a work piece to be polished or planarized; and (b) polishing or planarizing the surface of the work piece by mechanically and chemically causing the aqueous slurry to abrade the surface of the work piece to a predetermined extent.

The present invention also relates to products made using the polishing or planarizing method disclosed and claimed herein. Particularly desirable is a planarized semiconductor product made using the method set forth herein.

DEFINITIONS

"Particle size" as used herein refers to the average diameter of the particles, or if the particles are not substantially spherical, the average maximum dimension of the particles.

"Percent" or "%" as used herein, unless otherwise stated or unless it is otherwise clear from the context in which it is used, refers to the percentage by weight of the indicated components in relation to the total weight of the abrasive components in the present compositions.

DETAILED DESCRIPTION OF THE PREFERRED EMBODIMENTS

The abrasive compositions of the present invention comprise about 30 to about 50 percent and preferably about 42.5 to about 48.0 percent of the cerium oxide component. Most preferably, the present compositions comprise about 45 percent of cerium oxide. The cerium oxide used in the present compositions should have a particle size of about 100 to about 2,000 nm and preferably about 100 to about 500 nm. Most preferably, the cerium oxide has a particle size of about 100 to about 300 nm. It is preferred that the cerium oxide used in the present compositions be chemically refined, preferably to a purity of at least about 99.9%, without radioactive trace elements, such as thorium.

The abrasive compositions of the present invention further comprise about 8 to about 20 percent an preferably about 17 to about 19 percent of the fumed silica component. Fumed silica is available commercially from several sources. Generally, fumed silica (fumed silicon dioxide) is manufactured by hydrolysis of a volatile silane compound, such as silicon tetrachloride, in an oxygen-hydrogen gas flame. The manufacturing techniques are well known and documented. Most preferably, the present abrasive compositions comprise about 18 percent of fumed silica. The fumed silica used in the present compositions should have a particle size of about 10 to about 1,200 nm, preferably about 7 to about 40 nm and most preferably about 10 to about 30 nm.

The present compositions also comprise about 15 to about 45 percent and preferably about 35 to about 39 percent of precipitated silica. Precipitated silica also is available commercially from several sources. Generally, precipitated silica (precipitated silicon dioxide) is made by reacting an alkaline silicate solution, such as sodium silicate (waterglass) with a mineral acid, such as sulfuric acid, generally under alkaline reaction conditions. Silica is the major reaction product formed by precipitation. The silica is filtered, washed, dried and separated from residues of other reaction products, all of which are standard techniques well known to those skilled in the art. Preferably, the present compositions comprise about 35 to about 39 percent and most preferably about 37 percent of the precipitated silica component. The precipitated silica useful in the present abrasive compositions should have a particle size of about 25 to about 4,000 nm and preferably about 50 to about 2,000 nm. Most preferably, the precipitated silica has a particle size of about 100 to about 300 nm. It is further preferred that the precipitated silica have such a purity that it contains less than about 1% sodium.

A currently more preferred composition in accordance with the present invention comprises about 45 percent of cerium oxide having a particle size of about 100 to 2,000 nm; about 18 percent of fumed silica having a particle size of about 10 to 1,200 nm; and about 37 percent of precipitated silica having a particle size of about 25 to 4,000 nm.

The present invention is based on the important discovery that both fumed silica and precipitated silica must be used in combination with cerium oxide (ceria) to produce the desired results. The different characteristics of these two different types of silica, together with the cerium oxide, are responsible for the enhanced polishing capability of the abrasive compositions and aqueous slurries of the present invention, although the reason for this is not presently known. It is the combination of these three abrasives, i.e., cerium oxide, precipitated silica and fumed silica, which provides the excellent planarization action of the present abrasive compositions. The aqueous slurries of the present invention provide superior polishing and planarization compared to aqueous slurries of cerium oxide alone, fumed silica alone, precipitated silica alone or any combination of only two of these three abrasive components. The combination of these specific abrasives in the present composition provide a synergistic effect resulting in a superior planarization action.

When used to polish or planarize the surface of a work piece, the present compositions will be used in the form of an aqueous slurry of the present compositions and water. The aqueous slurries of compositions of the present invention may be prepared by appropriate methods, as will be evident to the artisan. However, it is preferred that the present compositions be prepared by adding the solid components of the abrasive composition to a suitable vessel containing the appropriate amount of water, and mixing, such as a high energy, high shear blender or homogenizer. Blending or mixing should be continued until a homogenous composition is obtained.

The slurries of the present abrasive compositions and water may further comprise various surfactant compounds or mixtures of surfactant compounds. The surfactant compounds act as suspension agents, thus aiding in the preparation of the present compositions. The addition of the surfactant acts to allow the aqueous slurries containing the present abrasive composition to take the form of a thixotropic composition. Moreover, it is believed that the surfactant compounds may provide an "anti-scratching" effect on the surface of the work piece being polished or planarized, thereby further decreasing the extent of surface defects caused by the abrasive agents.

The surfactant compounds may be present in the aqueous slurries in an amount of about 0.01 to about 2.0 percent and preferably about 0.015 to about 0.15 percent based on the weight of the slurry composition. Suitable surfactant compounds include any of numerous non-ionic, anionic, cationic or amphoteric surfactants known to those skilled in the art. The use of appropriate surfactants for a particular application will be evident to one of ordinary skill in the art based upon the present disclosure. However, it is preferred that octylphenylethyleneoxide, nonylphenylethyleneoxide, octylphenoxypolyethoxyethanol, polyoxyethylene (10) octylphenol ether, nonyl phenol polyether, polyoxyethylene (20) sorbitan monooleate, poly(oxy-1,2-ethanediyl)alpha(-nonylphenyl)omega-hydroxy, aliphatic ethoxylates, salts of carboxylic acid polyamine amides, alkylammonium salts of polymers having anionic or ionic character, polycarboxylic acids, acrylic acid copolymers or mixtures thereof, be used as the surfactant. Most preferably, the nonionic surfactant, octylphenoxypolyethoxyethanol is used as the surfactant in the present compositions. This surfactant is commercially available as "TRITON ® X-102" from Rohm and Haas Co.

Generally, the aqueous slurries of the present compositions should be maintained at a pH of about 4 to about 12 and preferably at a pH of about 6 to about 11.4. In order to maintain the pH within the desired ranges, the present compositions may further comprise an appropriate acidic or basic substance in an amount appropriate to maintain the desired pH. Examples of suitable acidic and basic substances which may be used in the present compositions include hydrochloric acid, nitric acid, phosphoric acid, sulfuric acid, potassium hydroxide, ammonium hydroxide or ethanolamine. Appropriate acids and bases as well as appropriate amounts thereof for a particular application will be evident to one skilled in the art based upon the present disclosure.

The present invention is further directed to a method of polishing or planarizing the surface of a work piece comprising: (a) applying an aqueous slurry of the present abrasive composition to a surface of a work piece to be polished or planarized; and (b) polishing or planarizing the surface of a work piece by mechanically and chemically causing the aqueous slurry to abrade the surface of the work piece to a predetermined extent.

When used in such a method, the present composition acts to mechanically and chemically abrade and dissolve the surface of the work piece to a predetermined and desired extent. The present composition acts only at the level surface of the work piece to provide a planar, smooth, defect-free surface without adversely affecting the underlying morphology and structure of the work piece.

When used to polish or planarize the surface of work pieces, the present compositions are generally used as aqueous compositions having a solids concentration of about 5 to about 20% by weight of the present abrasive composition as a final solids concentration. Preferably, the compositions have a final solids concentration of about 10 to about 16% by weight.

Although it has unlimited use in polishing various work pieces, the present method is advantageously used in polishing or planarizing the surfaces of interconnected, integrated circuits in semiconductor preparation. The present compositions are used to polish the dielectric layer down to a predetermined, planar level which may be composed of components of varying size, shape and hardness, as well as trenches, holes and valleys. Once the polishing of the dielectric layer such as amorphous silica is completed, a conductive layer such as tungsten may be deposited on top of the integrated surface, such as by chemical vapor deposition. This surface may then be further planarized or polished to the desired extent.

Thus, the present compositions can be used to polish or planarize the complex, anisotropic composite surfaces of semiconductor wafers to provide the extremely flat and level surfaces necessary in semiconductor technology. The present compositions can be used to polish surfaces of semiconductor wafers having a predetermined planar level, above which no portion of work piece is desired and below which exists electronic components which are defect-free. The surface can be planarized to the planar level without substantially causing adverse defects in the wafer below this planar level. Thus, the present method can be used to polish or planarize semiconductor wafers having regions of relatively less and relatively more electronic device integration density, wherein the surface of the work piece comprises a plurality of steps and a plurality of gaps between the steps.

In general, in practicing the method of the present invention, the present composition is applied to an appropriate polishing pad. The pad is then placed sufficiently proximate to the surface of the work piece at a sufficient pressure and for a sufficient time to polish or planarize the surface of the work piece by mechanically abrading the surface to a predetermined extent. Suitable polishing pads include Rodel-IC polishing pads and SUBA IV polishing pads, both available from Rodel, Inc., the assignee of this invention. The present compositions may be used in any conventional polishing or planarizing apparatus, such as the R. H. Strasbaugh 6DS-SP Planarizer manufactured by R. Howard Strasbaugh, Inc. of San Luis Obispo, Calif. or the Westech Model 372 Automatic Wafer Polisher by Westech Systems, Inc. of Phoenix, Ariz.

The present invention will now be illustrated by reference to the following specific, non-limiting examples.

EXAMPLES

Example 1

Seven sample compositions were prepared comprising the varying amounts of abrasive components set forth in Table I below. The cerium oxide used in all samples was "OPALINE" cerium oxide available from Rhonel-Poulenc Basic Chemicals Co. having a particle size of 300 to 500 nm. The fumed silica used in all samples was "AEROSIL" silica available from the Degussa Corporation having a particle size of 15 to 25 nm. The precipitated silica used in all samples was 22LS available from DeGussa having a particle size of 300 to 500 nm.

Aqueous slurries of the sample abrasive compositions were prepared by adding a total of 100 grams of the appropriate abrasive components in the percentages set forth in Table I to 900 grams of deionized water in a high shear blender. In all samples, 0.14 grams of the non-ionic surfactant octylphenoxypolyethoxyethanol, "TRITON® X-102", was then added. The samples were mixed thoroughly in a Waring Laboratory Blender or Homogenizer for approximately 3 minutes at room temperature.

Each sample was then individually used to polish a work piece. The work piece polished was a 6 inch diameter silicon wafer having planar circuity. The present slurry composition which was fed onto the polishing pad was thixotropic and fluid. The abrasive components did not settle out and stayed in suspension and therefore, did not require stirring. The slurry composition was used at room temperature.

Each sample composition was separately applied to a wafer. The wafer and sample composition were then placed in a Strasbaugh 6CA polishing machine outfitted with a polishing pad. The polishing pad comprised a Rodel IC-60 polishing pad laminated on top of a Mylar sheet which in turn was laminated to a Rodel SUBA IV polishing pad. The Rodel IC-60 and SUBA IV pads are available from Rodel, Inc. The wafer was then polished at a constant pressure of 7 psi for 2 minutes. The polishing composition was supplied to the polishing machine at a constant flow rate of 150 ml per minute.

Each sample composition was tested in four different final solid concentrations as set forth in Table I below. Specifically, each sample composition was tested at final solid concentrations of 5%, 8%, 10% and 12%. These concentration ranges refer to the total amount of solids in the final compositions applied to the wafer. After polishing under the conditions described above, the amount of material removed from the wafer was measured in angstroms of material and tabulated. The results are set forth in Table I:

TABLE I

| Sample No. | Abrasive Composition (Percentage by Weight) | | | Angstroms Removed* | | | |
|---|---|---|---|---|---|---|---|
| | CeO2 | Fumed Silica | Ppt. Silica | 5% | 8% | 10% | 12% |
| 1 | 100 | 0 | 0 | 1800 | 1850 | 1900 | 1900 |
| 2 | 0 | 100 | 0 | 2 | 2.5 | 3 | 3.5 |
| 3 | 0 | 0 | 100 | 2 | 2.5 | 3 | 3.5 |
| 4 | 45 | 55 | 0 | 1800 | 1600 | 1300 | 1100 |
| 5 | 45 | 0 | 55 | 1800 | 2100 | 2150 | 2000 |
| 6 | 0 | 36 | 64 | 2 | 2.5 | 3 | 4 |
| 7 | 45 | 18 | 37 | 1800 | 2200 | 4500 | 3100 |

*Using slurries having indicated concentrations of indicated abrasive composition sample, based on weight of slurry.

As can be seen from Table I, the aqueous slurry of the present compositions, which comprise a combination of cerium oxide, fumed silica and precipitated silica, remove significantly more material than when these abrasives are used in aqueous slurries alone or in other combinations at the same solids concentration. Moreover, it can be seen that compositions comprising fumed and precipitated silicas, either alone or in combination with each other, remove relatively smaller amounts of material.

After completing the measurements discussed above, the surfaces of the wafers were inspected for the presence of stains, scratches, surface defects, etc. by viewing the wafer surface with the unaided eye in bright light, and by looking at the surface under a 100× magnification in a dark field microscope. No stains, scratches or other surface defects were apparent on the surfaces of the wafers.

The degree of planarity of the surface of the polished wafers was then inspected with an "ALPHASTEP 200 PROFILOMETER" available from Tencor Corp. of Mountain View, Calif., which measures the displacement change in the height of an ultrafine needle riding across the surface of the wafer. This instrument scans a length of about 2,000 microns. The surface of each polished wafer was analyzed for the deviation from planarity in angstroms in comparison to the original feature height. The deviation from planarity in angstroms of the surface of each polished wafer in comparison to the original feature height is set forth in Table II below:

TABLE II

| Sample | Deviation from Planarity in Angstroms | | | |
|---|---|---|---|---|
| | 5% | 8% | 10% | 12% |
| 1 | 1800 | 1250 | 1825 | 1800 |
| 2 | 10000 | 12000 | 11000 | 12000 |
| 3 | 12000 | 11500 | 12000 | 12000 |
| 4 | 1600 | 1200 | 1400 | 1200 |
| 5 | 1100 | 1000 | 1200 | 900 |
| 6 | 12000 | 11500 | 11500 | 11500 |
| 7 | 60 | 480 | 215 | 380 |

As can be seen from the data set forth in Table II above, the present compositions demonstrate a significantly lower deviation in planarity from the original feature height in comparison to compositions comprising any one of the abrasives alone or only two of the abrasive agents in combination, at the same solids concentration.

The present invention may be embodied in other specific forms without departing from the spirit or essential attributes thereof and, accordingly, reference should be made to the appended claims, rather than to the foregoing specification, as indicating the scope of the invention.

We claim:

1. An abrasive composition for use in polishing or planarizing the surface of a work piece comprising about 30 to about 50 percent of cerium oxide; about 8 to about 20 percent of fumed silica and about 15 to about 45 percent of precipitated silica.

2. A composition as in claim 1 comprising about 42.5 to about 48.0 percent cerium oxide, about 17 to about 19 percent fumed silica and about 35 to about 39 percent precipitated silica.

3. A composition as in claim 1, comprising about 45 percent of the cerium oxide; about 18% percent of the fumed silica; and about 37 percent of the precipitated silica.

4. A composition as in claim 1, 2 or 3, wherein the cerium oxide has a particle size of about nm to about 2,000 nm, the fumed silica has a particle size of about 10 nm to about 1,200 nm and the precipitated silica has a particle size of about 25 nm to about 4,000 nm.

5. A composition as in claim 1, 2 or 3, wherein the cerium oxide has a particle size of about 100 nm to about 500 nm, the fumed silica has a particle size of about 7 nm to about 40 nm and the precipitated silica has a particle size of about 50 nm to about 2,000 nm.

6. A composition as in claim 1, 2 or 3, wherein the cerium oxide has a particle size of about 100 nm to about 300 nm, the fumed silica has a particle size of about 10 nm to about 30 nm and the precipitated silica has a particle size of about 100 nm to about 300 nm.

7. An aqueous slurry for polishing or planarizing a work piece comprising water and about 5 to about 20 weight percent of the abrasive composition of claim 1.

8. An aqueous slurry as in claim 7, wherein the cerium oxide has a particle size of about 100 nm to about 2,000 nm, the fumed silica has a particle size of about 10 nm to about 1,200 nm and the precipitated silica has a particle size of about 25 nm to about 4,000 nm.

9. An aqueous slurry as in claim 8, further comprising about 0.01 to about 2.0 percent of a surfactant.

10. An aqueous slurry as in claim 9, wherein the surfactant is selected from the group consisting of non-ionic surfactants, anionic surfactants, cationic surfactants, amphoteric surfactants and mixtures thereof.

11. An aqueous slurry as in claim 10, wherein the surfactant is selected from the group consisting of octylphenylethyleneoxide, nonylphenylethyleneoxide, octylphenoxypolyethoxyethanol, polyoxyethylene (10) octylphenol ether, nonyl phenol polyether, polyoxyethylene (20) sorbitan monooleate, poly(oxy-1,2-ethanediyl)alpha(nonylphenyl)omega-hydroxy, aliphatic ethoxylates, salts of carboxylic acid polyamine amides, alkylammonium salts of polymers having anionic or ionic character, polycarboxylic acids, acrylic acid copolymers and mixtures thereof.

12. An aqueous slurry as in claim 11, wherein the surfactant is octylphenoxypolyethoxyethanol.

13. An aqueous slurry as in claim 8, further comprising an acidic or basic material to maintain the pH of the composition at about 4 to about 12.

14. An aqueous slurry as in claim 13, wherein the acidic or basic material maintains the pH at about 6 to about 11.4.

15. An aqueous slurry as in claim 13, wherein the acidic material is selected from the group consisting of hydrochloric acid, nitric acid, phosphoric acid and sulfuric acid, and the basic material is selected from the group consisting of potassium hydroxide, ammonium hydroxide and ethanolamine.

16. An aqueous slurry for polishing or planarizing a work piece comprising water and about 10 to about 16 percent of the abrasive composition of claim 2.

17. An aqueous slurry as in claim 16 wherein the cerium oxide has a particle size of about 100 nm to about 500 nm, the fumed silica has a particle size of about 7 nm to about 40 nm and the precipitated silica has a particle size of about 50 nm to about 2,000 nm.

18. An aqueous slurry for polishing or planarizing a work piece comprising water and about 10 to about 16% by weight of the abrasive composition of claim 3.

19. An aqueous slurry as in claim 18 wherein the cerium oxide has a particle size of about 100 nm to about 300 nm, the fumed silica has a particle size of about 10 nm to about 30 nm and the precipitated silica has a particle size of about 100 nm to about 300 nm.

20. An aqueous slurry as in claim 19 further comprising about 0.01 to about 2.0 percent of a surfactant selected from the group consisting of octylphenylethyleneoxide, nonylphenylethyleneoxide, octylphenoxypolyethoxyethanol and mixtures thereof.

21. A method of polishing or planarizing the surface of a work piece comprising:
   (a) applying the aqueous slurry of any one of claims 7 through 20 to a surface of the work piece to be polished or planarized; and
   (b) polishing or planarizing the surface of the work piece by mechanically and chemically causing the aqueous slurry to abrade the surface of the work piece to an extent.

22. A method as in claim 21 comprising applying the aqueous composition to a pad and then causing the pad to be sufficiently proximate the surface of the work piece at a pressure and for a time sufficient to polish or planarize the work piece.

23. A method as in claim 22 wherein the work piece is a semiconductor wafer having regions of relatively less and more electronic device integration density, the surface of the wafer having a plurality of steps and a plurality of gaps between at least some of the steps.

24. A method as in claim 23 wherein the surface of the wafer has a planar level above which no work piece material is desired and below which there exists electronic components which are desirably defect-free, the method further comprising planarizing the surface of the wafer to the planar level without substantially adverse defects in the wafer below the planar level.

* * * * *